United States Patent
Fujii et al.

(10) Patent No.: US 6,253,571 B1
(45) Date of Patent: Jul. 3, 2001

(54) LIQUID DISTRIBUTOR, FALLING FILM HEAT EXCHANGER AND ABSORPTION REFRIGERATION

(75) Inventors: Tatsuo Fujii; Satoshi Miyake, both of Ibaraki-ken; Takehiro Sato, Tsuchiura, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,034
(22) PCT Filed: Mar. 17, 1997
(86) PCT No.: PCT/JP97/00838
  § 371 Date: Sep. 15, 1999
  § 102(e) Date: Sep. 15, 1999
(87) PCT Pub. No.: WO98/41798
  PCT Pub. Date: Sep. 24, 1998
(51) Int. Cl.[7] ....................................... F25B 15/12
(52) U.S. Cl. .................................. 62/484; 62/494
(58) Field of Search ............... 62/484, 494, 485; 165/118

(56) References Cited

U.S. PATENT DOCUMENTS

| | | | |
|---|---|---|---|
| 4,216,002 | * 8/1980 | Rosenblad | 55/267 |
| 4,519,448 | * 5/1985 | Allo et al. | 165/118 |
| 4,567,942 | * 2/1986 | Stafford et al. | 165/118 |
| 4,748,830 | * 6/1988 | Oouchi et al. | 62/476 |
| 4,799,542 | * 1/1989 | Sladky | 165/118 |
| 4,932,468 | * 6/1990 | Ayub | 165/118 |
| 5,622,060 | * 6/1990 | Kang | 62/485 |

* cited by examiner

Primary Examiner—Michael Powell Buiz
Assistant Examiner—Melvin Jones
(74) Attorney, Agent, or Firm—Antonelli, Terry, Stout & Kraus, LLP

(57) ABSTRACT

A liquid distributor, a falling film heat exchanger and an absorption refrigerating machine, which are inexpensive and favorably ensure uniform distribution of a liquid even in the case where the liquid distributor is installed in oblique position and foreign matters such as metal particles or the like are mixed in the liquid. The liquid distributor comprise a primary distribution duct of box-shaped cross section having an opening serving as a liquid inlet, and distribution holes serving as liquid outlets and formed on side surfaces of the primary distribution duct, and a group of box-shaped secondary distribution trays spaced from outer side surface and lower side surface of the primary distribution duct, and formed to be compartmented into a plurality of regions in a longitudinal direction of the primary distribution duct. Liquid dripping holes, through which the liquid is dropped, are formed in bottom surfaces of the secondary distribution trays. The liquid distributor is incorporated in falling film heat exchangers or absorption refrigerating machines.

15 Claims, 12 Drawing Sheets

LIQUID DISTRIBUTOR, FALLING FILM HEAT EXCHANGER AND ABSORPTION REFRIGERATION

BACKGROUND OF THE INVENTION

The present invention relates to a liquid distributor, a falling film heat exchanger, and an absorption refrigerating machine.

RELATED ART

Conventionally, liquid distributors for falling film heat exchangers include a dripping type one, a spraying type one and the like, and falling film heat exchangers using such liquid distributors have been widely used for evaporators, absorbers, regenerators, low temperature regenerators in absorption refrigerating machines, and low temperature regenerators in dual-effect absorption refrigerating machines. For example, in the evaporator, a multiplicity of heat exchanger tubes are arranged horizontally in a closed vessel to form banks of heat exchanger tubes. A liquid coolant being an evaporative cooling medium is made to flow down surfaces of the banks of heat exchanger tubes, and evaporation of the liquid coolant is promoted by causing an absorber connected to the closed vessel to absorb vapor. Such heat of evaporation cools a heat exchanging medium in the tubes through the heat exchanger tubes.

Evaporation occurs at a gas-liquid interface of the liquid coolant, which covers the outer surfaces of the heat exchanger tubes, and the larger a ratio of an area of portions covered by the liquid coolant, to an entire surface area of the heat exchanger tubes, the higher the evaporating performance is enhanced. The ratio of the areas is increased by uniformly feeding the liquid coolant, which forms falling liquid films, in a longitudinal direction of the heat exchanger tubes. Further, in the case where the banks of heat exchanger tubes are arranged in a plurality of rows in a vertical direction, the ratio of an area of portions covered by the liquid coolant, to an entire surface area of the heat exchanger tubes is increased for an improved performance of the evaporator by uniformly feeding the liquid coolant in the longitudinal direction of the topmost stage of the respective tube array.

Accordingly, in order to enhance the evaporating performance, it is necessary to uniformly distribute the liquid coolant, which forms falling liquid films, along the overall lengths of the heat exchanger tubes. Further, in order to form falling liquid films in a wide region with a limited amount of the liquid coolant supplied, it is important to surely distribute all the liquid coolant over the banks of heat exchanger tubes so as not to produce ineffective liquid coolant which would fall down without forming falling liquid films. In connection with this, a dripping type liquid distributor capable of surely supplying a liquid over surfaces of the heat exchanger tubes is advantageous over a spraying type one, in which a liquid is uniformly sprayed in planar manner.

Japanese Patent Unexamined Publication No. 5-172438 discloses an example of a drip type liquid distributor, in which a branch header, a distribution pipe for primary distribution, which is disposed in parallel with heat exchanger tubes, a splash preventing cover plate, and a primary liquid droplet dispersing plate in order to improve distribution of sprinkling density, that is, distributing performance.

Further, Japanese Patent Unexamined Publication No. 7-4782 discloses another drip type liquid distributor, which comprises a box-shaped primary distribution tray disposed in parallel with heat exchanger tubes, a wide secondary distribution guide body of mountain-shape arranged below the distribution tray, and block-off walls provided at four sides of a liquid receiving section in the guide member to be tray-shaped to store a liquid on a top surface thereof, thereby preventing a liquid surface from disappearing from the guide member on an upper side in the event of being installed in oblique position.

Further, as measures for preventing degradation of performance depending upon the configuration of heat exchanger tubes in the case of an absorption refrigerating machine body being installed in oblique position, Japanese Patent Unexamined Publication No. 8-159605 discloses an apparatus, in which heat exchanger tubes are formed therein with a plurality of recesses, which extend in an axial direction of the heat exchanger tubes to be discontinuously arranged extending in the axial direction.

With the above-described spray type liquid distributor, nozzles are required to be provided on the lower surface of a distribution pipe installed in parallel with the heat exchanger tubes, and spray holes having a small diameter of 4 mm or less are required for atomizing the liquid, which results in failure of spraying due to blocking-off of the spray holes by foreign matters such as metallic particles, which might be mixed in the liquid.

Further, Japanese Patent Unexamined Publication No. 5-172438 discloses a liquid distributor having such a complicated configuration that two rows of heat exchanger tubes require a single distribution pipe, a cover plate and a liquid droplet distributing plate which belong to the distribution pipe, thus the liquid distributor becoming high in cost. Further, the liquid displaying device disclosed in the Japanese Patent Unexamined Publication No. 7-4782 is many in the number of parts and complicated in construction to become high in cost because two rows of heat exchanger tubes require a single tray and a guide body having blocking-off walls at four sides thereof, and downwardly extending flashing protrusions must be provided on the respective guide bodies so as to smoothly drip a liquid.

Further, the guide body having blocking-off walls at four sides thereof is in the form of a tray, and is capable of storing the liquid on a top surface thereof. However, in the case where the guide body is inclined under the condition of installation, such inclined arrangement causes the liquid flowing out from a primary distribution tray to be moved toward the lower side of the guide body on the guide body. As a result, liquid heads in distribution holes are extremely different between the upper side and the lower side of the guide body, so that a flow rate of the liquid from dripping holes provided on the upper side of the inclined guide body decreases while the flow rate on the lower side thereof increases. In this manner, in the case where the liquid distributor is installed in inclined manner, outflowing of the liquid from the lower side of the inclined guide body can be blocked off, but distribution in a longitudinal direction remains extremely nonuniform.

Further, because the primary distribution tray is of open type, distribution of the liquid from the primary distribution tray become nonuniform due to different liquid heads in the distribution holes between the upper and lower sides of the tray in the case where the tray is installed in inclined manner.

Further, rows of heat exchanger tubes, to which a single liquid distributor can feed a liquid, is fixed in two in number in either of the liquid distributors disclosed in the above-described Japanese Patent Unexamined Publication Nos.

5-172438 and 7-4782. Accordingly, if a combination of the above two is used to try to set the number of rows of heat exchanger tubes in a falling film heat exchanger to an odd one, a liquid supplied in an amount of capable of forming falling liquid films on one row of the heat exchanger tubes falls into the bottom of the heat-exchanger without being fed onto the heat exchanger tubes, which results in waste spraying. Thus, such arrangement is low in degree of freedom in design, and thus impedes optimization, which takes performance, size and cost into account.

Further, with the liquid distributor disclosed in the above-described Japanese Patent Unexamined Publication No. 8-159605, a plurality of recesses extending in an axial direction of heat exchanger tubes are provided discontinuously on outer surfaces of the heat exchanger tubes, and so performance is not degraded due to the inclined installation. However, such effect premises that the liquid is uniformly distributed over and dripped onto the topmost stage of the heat exchanger tubes, so that such arrangement has not yet solved the above-described problems essentially.

SUMMARY OF THE INVENTION

An object of the present invention is to provide a liquid distributor, which realizes favorable distribution of a liquid even when the distributor is installed in oblique position.

Another object of the present invention is to provide a liquid distributor, which realizes favorable distribution of a liquid over a long term by eliminating influences even when foreign matters such as metal particles are mixed in the liquid, which is to be dripped onto heat exchanger tubes.

A further object of the present invention is to provide a liquid distributor, which realizes stable feeding and dripping of a liquid without causing instability of distribution and dripping of the liquid due to abrupt vapor absorption, self-evaporation, boiling or the like, even when the liquid to be dripped onto the heat exchanger tubes has a different saturated vapor pressure from vapor pressure in a falling film heat exchanger.

A still further object of the present invention is to provide a liquid distributor, which is simple in configuration and low in cost.

A further object of the present invention is to provide a falling film heat exchanger of high performance and an absorption refrigerating machine of high performance, in which the above-described liquid distributor is used.

A still further object of the present invention is to provide a falling film heat exchanger and an absorption refrigerating machine, which are not limitative with respect to the number of rows of heat exchanger tubes and which are high in degree of freedom for design is high and can be optimized in consideration of performance, size and cost.

The above-described objects is attained by a liquid distributor for distributing and sprinkling a liquid, which involves phase change in heat exchanging process, onto banks of heat exchanger tubes from above, the liquid distributor comprising a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, said respective regions being formed therein with liquid dripping holes for dripping the liquid.

Further, the above-described objects is attained by a falling film heat exchanger comprising banks of heat exchanger tubes for effecting heat exchange inside and outside thereof, and a liquid distributor for distributing and sprinkling a heat exchanging medium from above the heat exchanger tubes, which constitute the banks, said heat exchanging medium being adapted to flow down by gravity to form liquid films on outer wall surfaces of the heat exchanger tubes to make heat exchange with the heat exchanging medium, which flows in the tubes, the liquid distributor comprising a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, the respective regions being formed therein with liquid dripping holes for dripping the liquid, and wherein respective heat exchanger tubes, which constitute said banks of heat exchanger tubes, are in parallel to the liquid dripping holes formed in said liquid distributor.

Further, the above-described objects is attained by a multi-effect absorption refrigerating machine including an evaporator, an absorber, a high temperature regenerator, a low temperature regenerator, liquid distributors, which are incorporated into the evaporator, the absorber and the regenerator to distribute and sprinkle a heat exchanging medium from above heat exchanger tubes incorporated into the low temperature regenerator to effect heat exchange inside and outside of the heat exchanger tubes, and a condenser, the liquid distributor comprising a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, the respective regions being formed therein with liquid dripping holes for dripping the liquid, and wherein at least either of the evaporator, the absorber and the low temperature regenerator incorporates thereinto a falling film heat exchanger device, in which respective heat exchanger tubes, which constitute said banks of heat exchanger tubes, are in parallel to the liquid dripping holes formed in said liquid distributor.

DETAILED DESCRIPTION OF PREFERRED EMBODIMENTS

Explanation will be given to an embodiment of the present invention with reference to FIGS. 1 to 4.

Figure 1:
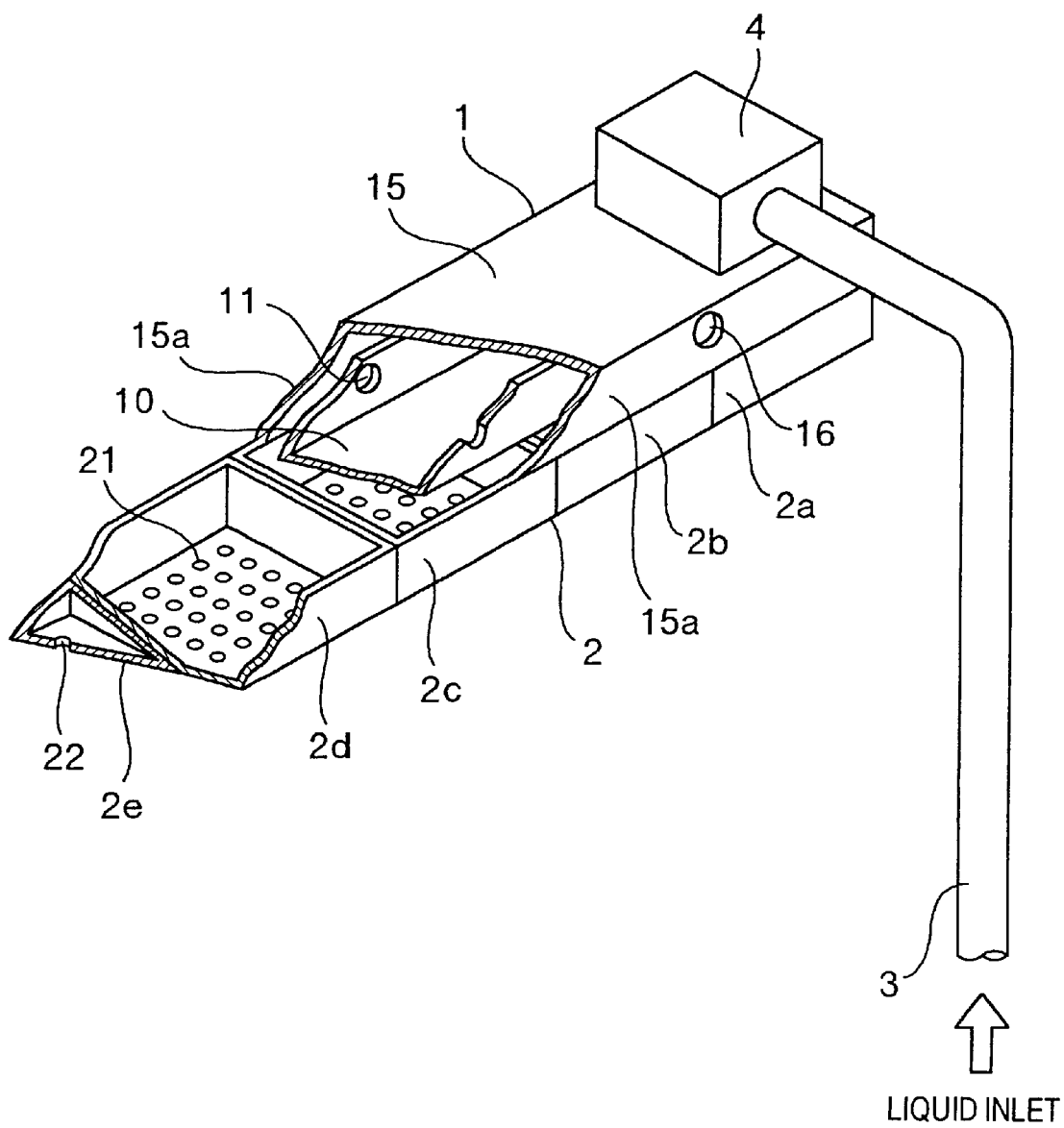
FIG. 1 is a fragmentary perspective view showing an embodiment of a liquid distributor according to the present invention.

As shown in FIG. 1, a liquid distributor is composed of a closed-type primary distribution duct 1 and a group of opened type secondary distribution trays 2, the liquid distributor being connected to a pipe 3 for feeding liquid thereinto, and to an inlet header 4, of which lower section is communicated inside of the primary distribution duct 1.

Further, the primary distribution duct 1 is composed of a first component member 10 having an upwardly opened U-shaped cross section, and a second component member 15 having a downwardly opened U-shaped cross section. The distribution duct 1 has a rectangular-shaped internal cross section. Further, a plurality of liquid distribution holes 11 having one and the same shape are formed in each of left and right side surfaces of the first component member 10 to be arranged in two rows, that is, one on the left side and one on the right side of the first component member 10, respectively, the distribution holes having their centers located on an axial straight line of the primary distribution duct 1 and all having one and the same shape.

Further, the second component member 15 has a vertical section 15a serving as a guide panel for conducting a liquid flowing out from the distribution holes 11 to the secondary distribution trays, and is formed with a plurality of vent holes 16. The vent holes 16 are opened intermediate between the respective liquid distribution holes 11 in the primary distribution duct 1 as viewed from sides of the liquid distributor. Although not shown, opposite end portions of the first component member 15, that is, short side portions thereof, serve as blocking-off walls for preventing the liquid from flowing out, and accordingly, the primary distribution duct 1 is closed to outside except that it is not at a section communicated with the inlet header 4 and at the liquid distribution holes 11.

The group of secondary distribution trays 2 includes a plurality of trays 2a, 2b, . . . 2m (see FIG. 5) provided with a multiplicity of liquid dripping holes 21, around which downward extending protrusions 22 are formed. The plurality of liquid distribution holes 11 in the primary distribution duct 1 are provided right and left of the duct to be symmetrical with respect to the duct, and a set of the distribution holes 11 one on the left and one on the right side correspond to each of the trays. Accordingly, the liquid holes 11 in the primary distribution duct 1 are two for each of the trays, and so are the same in number. The multiplicity of liquid dripping holes 21 formed in the lower surfaces of the secondary distribution trays 2a, 2b . . . 2m are formed by burring, and the downwardly extending protrusions 22 formed around the liquid distribution holes are formed by downwardly deforming the material of the bottom surface of the tray during burring.

The liquid to be distributed is conducted to the header 4 through the distribution pipe 3 to flow into the primary distribution duct 1, and then is discharged from the distribution holes 11. Further, the liquid is conducted to the plurality of secondary distribution trays 2a, 2b, . . . 2m, which constitute the group of primary distribution trays 1, by the vertical section 15a of the secondary component member 15a of the primary distribution duct 1, and then is permitted to drip onto the heat exchanger tubes 5 through the liquid dripping holes 21 formed in the respective trays.

As described above, in the embodiment, the primary distribution duct is of closed type, so that flow resistance of the liquid distribution holes, which govern the liquid distribution from the duct into the trays, that is, pressure difference between upstream and downstream sides of the distribution holes can be set great by suitably determining an inner diameter of the liquid distribution holes.

Accordingly, even when the liquid distributor is installed obliquely in an axial direction, the pressure difference caused by the flow resistance becomes dominant with respect to the liquid distribution from the duct into the trays, so that it is possible to eliminate influence of a difference in height between the opposite end sections of the duct, caused by such oblique disposition of the liquid distributor.

Figure 5:
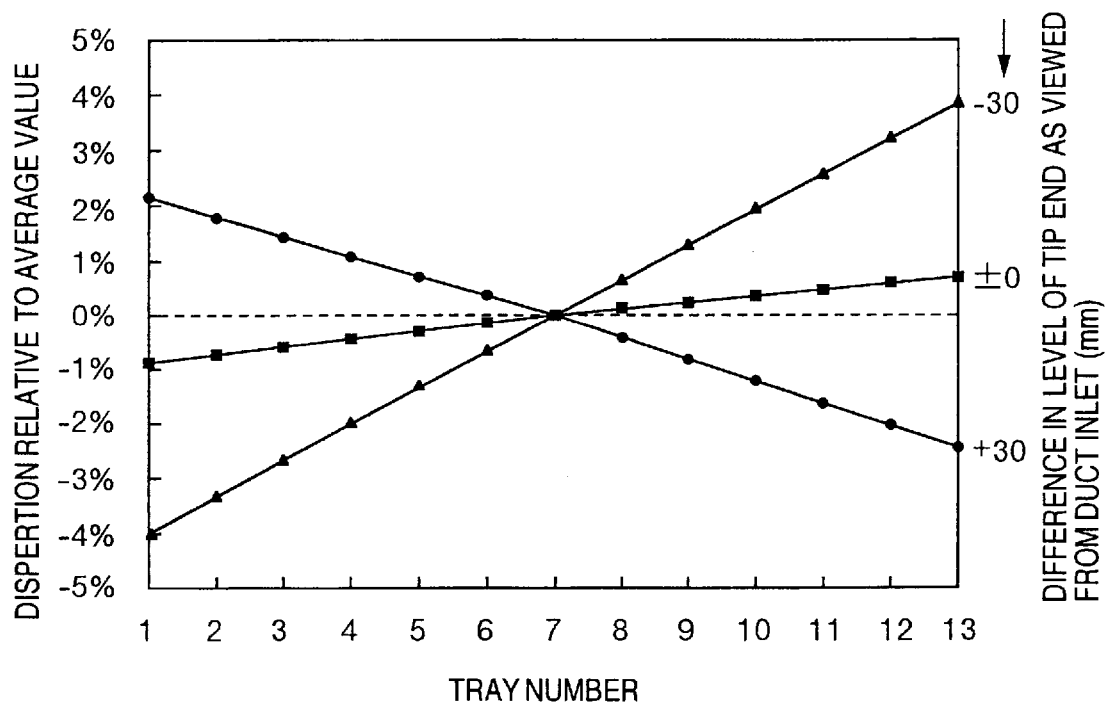
FIG. 5 is a graph showing a flow rare distribution from a primary distribution duct into a secondary distribution duct in the liquid distributor shown in FIG. 1, with unevenness around an averaged value.

The above-described advantages will be explained in details with reference to FIG. 5.

In the figure, the abscissa represents the tray number, and the ordinate represents dispersion in flow rate of the liquid fed into trays 2a, 2b, . . . 2m from the primary distribution duct 1 relative to an averaged value for all the trays. This figure shows liquid distribution characteristics for those cases, in which the end portion is higher by 30 mm as viewed from the duct inlet side, in which the end portion is lower by 30 mm, and in which the duct is installed completely horizontally direction for the sake of comparison, assuming that the liquid distributor is installed obliquely in the axial direction. These distribution characteristics were found through calculation in the case of the number of the secondary distribution trays being thirteen, taking into account an internal friction loss in the primary distribution duct 1, recovery of static pressure caused by virtue of the flow rate decreasing as it goes toward the end portion, pressure losses at liquid distribution holes 11, and pressure change caused by inclination of the duct in the axial direction.

It is seen from the figure that, even when the distributor is obliquely arranged to impart to the end portion a difference of 30 mm in the vertical direction relative to the inlet, amounts of the liquid distributed into the trays fall within ±5% around the averaged value, which indicates that the distribution characteristics are favorable.

Further, in this embodiment, the same number, that is, two of the liquid distribution holes 11 are allotted to the secondary distribution trays 2a, 2b, . . . 2m, and all the liquid distribution holes are circular to have the same diameter, and are arranged in two rows in the axial direction of the duct to have their centers located on a straight line. With this arrangement, the above-described effect is realized.

Further, the first distribution duct is rectangular in axial, cross section, so that, when foreign matters 12 such as metal particles mix in the liquid, they become stagnant in corners of the rectangular cross-sectional shape of the duct, which are less influenced by the flow of the liquid. Accordingly, the foreign matters are caught by the primary distribution duct, so that it is possible to prevent failure in dripping through the dripping holes 21 while the liquid flows into the secondary distribution trays 2.

Further, the liquid distribution holes 11 are formed in the side surfaces of the primary distribution duct 11, so that foreign matters caught at the corners can be kept in the lower portion of the duct 11, and the action of preventing the foreign matters from flowing into the above-described secondary distribution trays 2 is made more effective.

Further, these liquid distribution holes are opened so that their centers are positioned at a level above a horizontal plane 13, which bisects the sectional area of the duct vertically. Accordingly, a particular amount of the foreign matters having sunk to the lower portion of the duct by gravitation can be retained to preserve the above-described action of catching foreign matters over a long term.

Further, the favorable distribution characteristic of the primary distribution duct permits feeding the liquid to the secondary distribution trays 2a, 2b, . . . 2m at a substantially equal flow rate. Thus, amounts of the liquid kept on the respective trays are substantially equal to one another.

Figure 4:
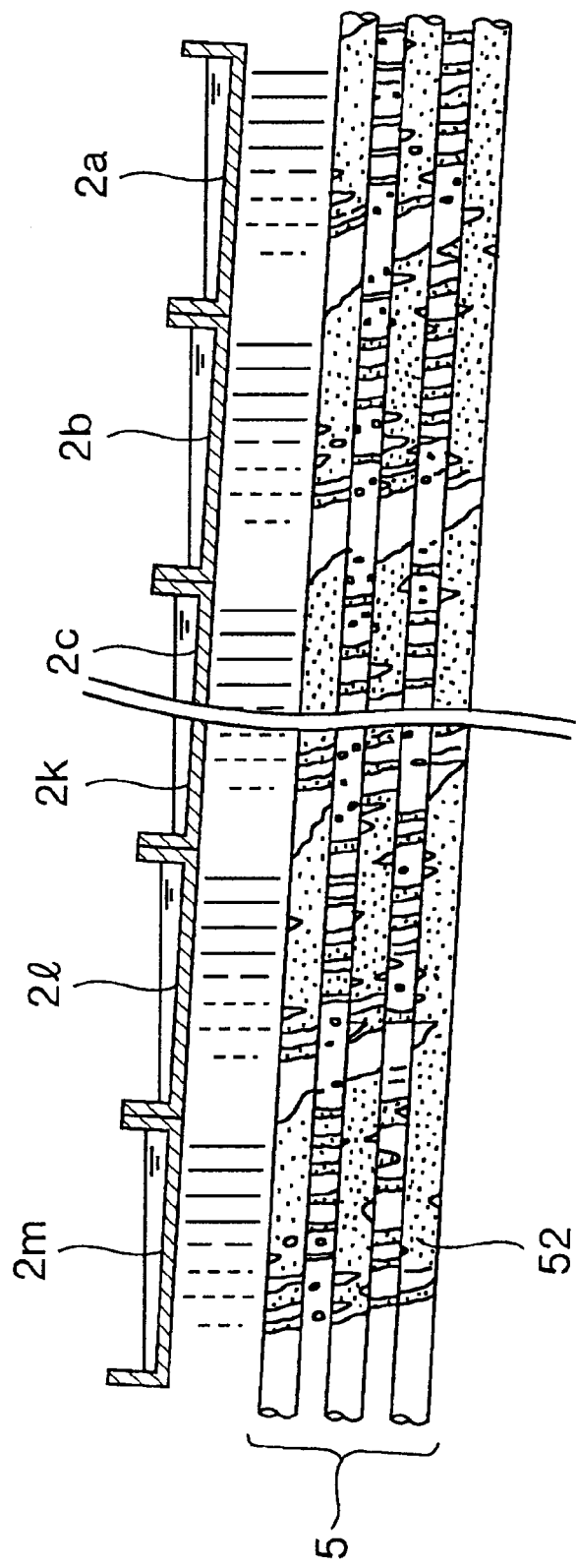
FIG. 4 is a side view a configuration of dripping onto banks of heat exchanger tubes, and a configuration of a falling liquid film in such a case the liquid distributor shown in FIG. 1 is inclined in the axial direction thereof.

Thus, as shown in FIG. 4, even if oblique arrangement of the heat exchange tube banks makes distribution of amounts of dripping throughout the entire liquid distributor in such a manner as to alternately generate regions where amounts of dripping are great and regions where amounts of dripping are small, the liquid is made to shift into regions, in which amounts of dripping are small and the falling liquid film is insufficiently generated, from adjacent zones, in which amounts of dripping are great. Thus, it is possible to favorably achieve generation of the falling liquid film over a wide region of the heat exchanger tube banks except only a region which is at the highest position.

Figure 6:
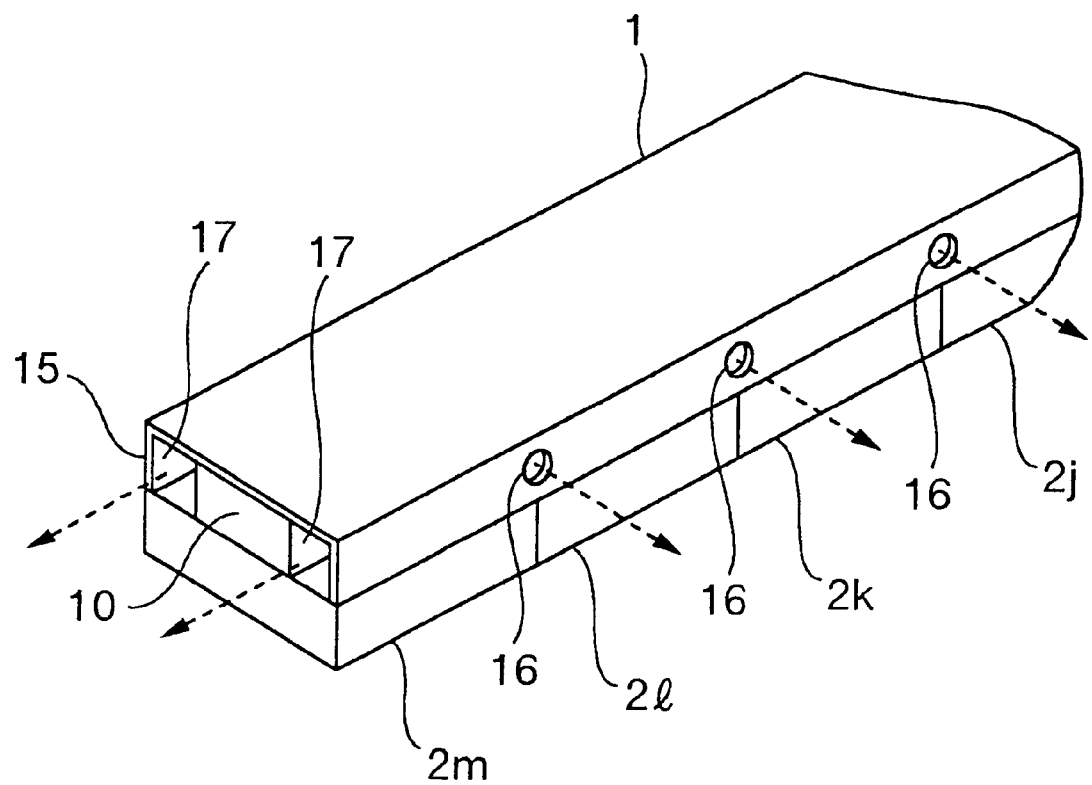
FIG. 6 is a perspective view showing vent holes in the liquid distributor shown in FIG. 1.

Further, in the embodiment, as shown in FIG. 6, the outside of the primary distribution duct 1, that is, the portion above the group of secondary distribution trays 2 is communicated to a space in the heat exchanger through the medium of the vent holes 16 and openings 17 at the ends thereof. Therefore, in the case where the liquid fed into the liquid distributor is in super-heated condition relative to the vapor pressure in the heat exchanger, it is self-evaporated in the stage of flowing out from the primary distribution duct 1, and is brought into saturated condition. Accordingly, it is possible to realize smooth and stable dripping of the liquid without causing self-evaporation during at the time of dripping to scatter the liquid outside the heat exchanger tube banks.

In addition, vapor generated by self-evaporation on the secondary distribution trays flows into the heat exchanger through the vent holes 16 and the end openings 17 as indicated by dotted arrows in FIG. 6.

In the embodiment, the vent holes 16 are provided in large numbers as shown in FIG. 6, assuming that the liquid to be distributed onto the heat exchanger tube banks 5 is in super-heated condition relative to the vapor pressure in the heat exchanger. The vent holes may be omitted in the case where the liquid distributor is used on condition that such assumption is not likely. However, the provision of the openings 17 is desirable because of the need of discharging the inside gas in the course of formation of the liquid surfaces on the secondary distribution trays at the time of starting.

Further, in the embodiment, the downwardly extending protrusions 22 are provided around the multiplicity of liquid dripping holes 21 formed in the lower surfaces of the secondary distribution trays 2a, 2b, . . . 2m, which causes the liquid to surely drip immediately below the dripping holes, thus preventing the liquid from adhering to the lower surfaces of the trays, and from falling outside of the heat exchanger tube banks or between the heat exchanger tubes to spread wastefully. Further, the protrusions 22 are formed by deforming portions of the lower surfaces of the trays by means of burring, which eliminates separate use of additional parts and makes it possible to manufacture the protrusions at low cost.

Further, the dripping holes 21 are formed in plural rows over the entire liquid distributor in the axial direction of the liquid distributor, whereby the liquid to be dripped is made in plural rows, and all the liquid fed can be surely conducted to the heat exchanger tube banks by making such rows of the liquid correspond to the respective heat exchanger tubes installed or rows of the heat exchanger tubes in the longitudinal direction in the heat exchanger.

Explanation will be given to the liquid distributing device with reference to FIGS. 7 and 8.

The liquid distributor comprises in combination the inlet header 4, the first component member 10, which constitute the primary distribution duct, the second component member 15 and the secondary distribution trays 2. The group of secondary distribution trays 2 are composed of secondary distribution trays 2a, 2b, . . . 2h having the same shape, and arranged in a row in the axial direction of the primary distribution duct, as shown in FIG. 8.

The inlet header 4 is formed with an opening 41, to which a pipe for feeding of the liquid is connected, and the second component member 15 is formed with an opening 18, which provides communication between an interior of the header 4 and an interior of the primary distribution duct. Since the secondary distribution trays 2a, 2b, . . . 2h are in the form of a substantially rectangular parallelepiped to make connection easy. Assembly of the entire device is extremely easy although being a dripping type distributor, and so an increase in the number of rows of the liquid dripping holes 21 in the axial direction results in the possibility of feeding the liquid to a many rows of the heat exchanger tubes for a set of the components, which can achieve reduction in cost for the falling film heat exchanger in its entirety.

According to the present embodiment, the group of secondary distribution trays 2 are composed of the trays 2a, 2b, . . . 2h having one and the same shape, whereby the same trays can be applied to heat exchangers having different capacities, through increasing or decreasing the number of the trays and hence changing the entire length, and so it becomes possible to enhance productivity due to mass production of the same parts, which leads to reduction in cost.

Figure 9:
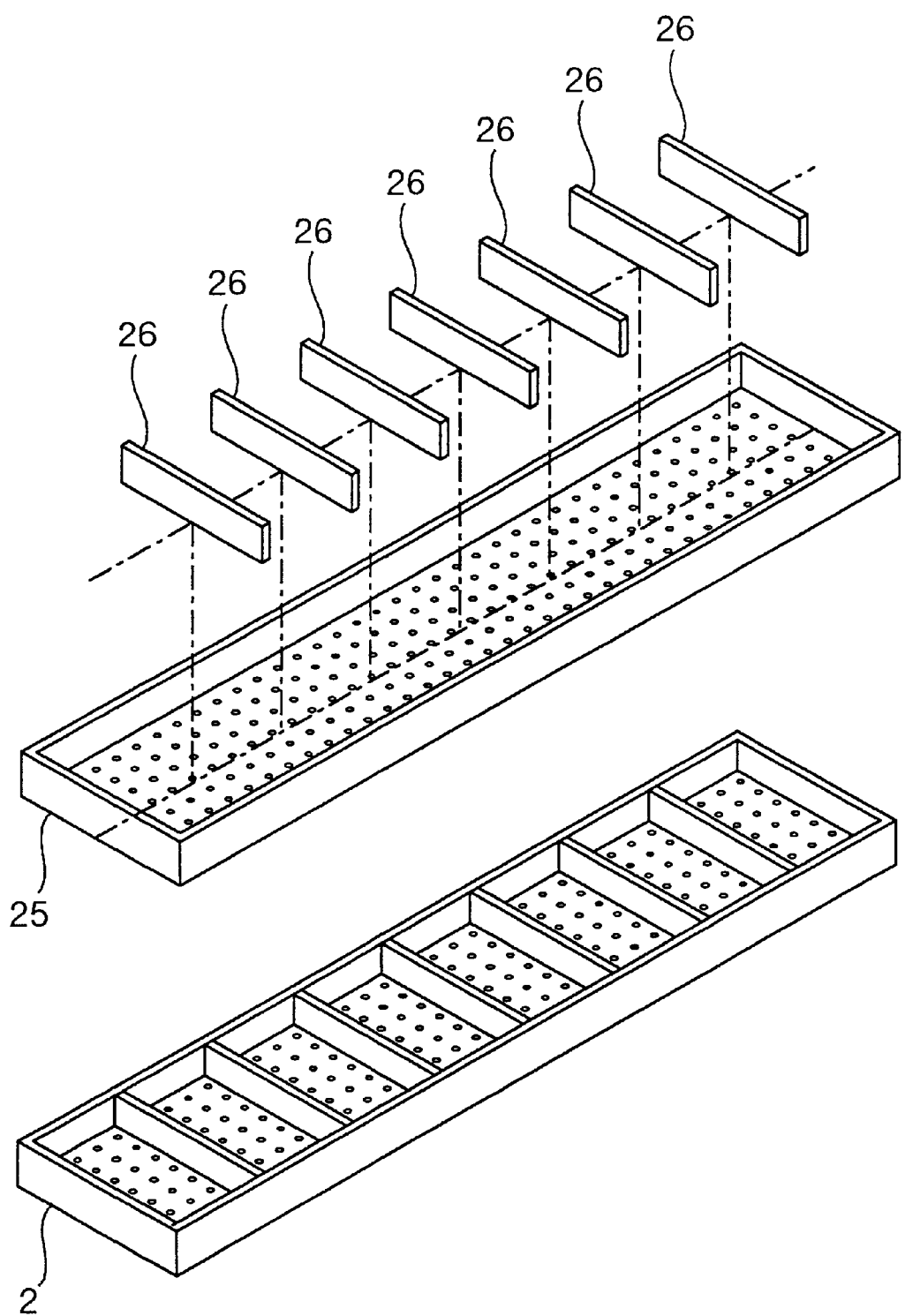
FIG. 9 is an exploded perspective view showing a secondary distribution tray in another embodiment of the liquid distributor according to the present invention.

Subsequently, explanation will be given to a liquid distributor according to another embodiment of the present invention, with reference to FIG. 9.

Figure 7:
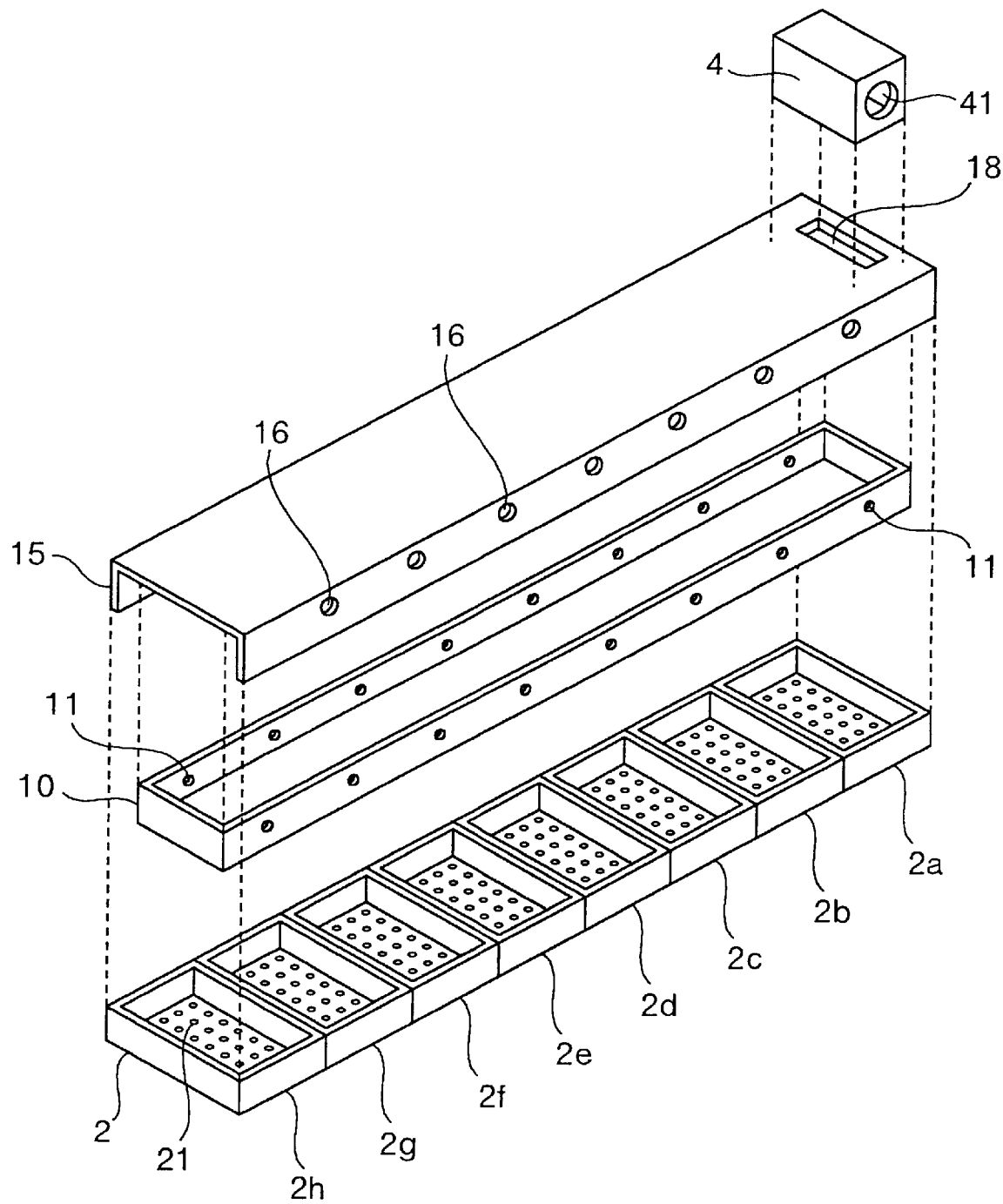
FIG. 7 is an exploded perspective view showing the liquid distributor shown in FIG. 1.
Figure 8:
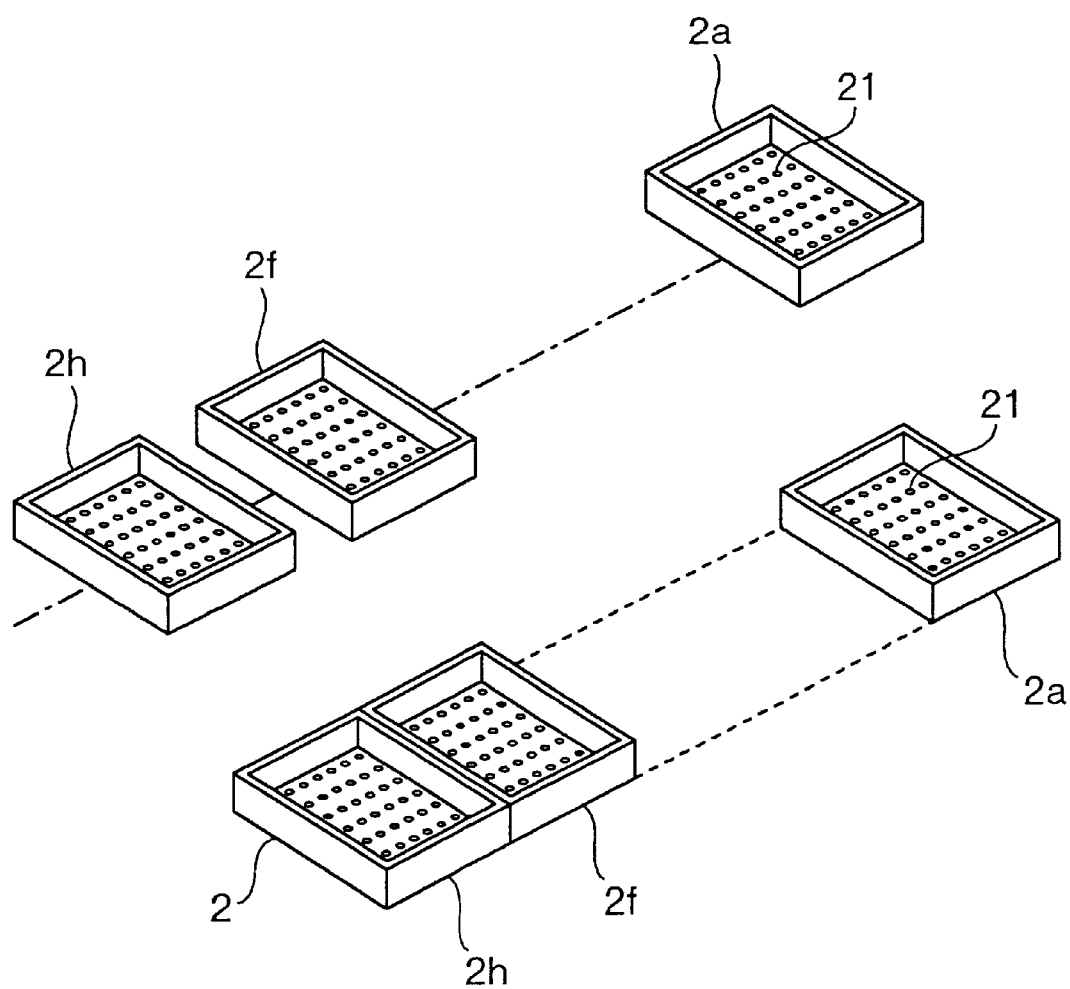
FIG. 8 is an exploded perspective view showing a secondary distribution tray in the liquid distributor, shown in FIG. 7.

In the drawing, in stead of forming the secondary distribution trays 2 from a plurality of trays having one and the same shape as shown in FIG. 7, a secondary distribution trays 2 is formed by dividing an interior of a tray body 25, having the same length as that of the primary distribution duct, into a plurality of regions, and installing tray partition plates 26, which are means for restricting flowing of the liquid between the regions.

In this embodiment, a single tray partition plate 26 serves as a member capable of dividing the interior of the secondary distribution tray 2, thus contributing to saving in quantity of materials for construction of the entire tray 2 and making the entire tray lightweight.

Explanation will be given to another embodiment of the present invention with reference to FIG. 10.

The liquid distributor shown in the drawing has the same parts and the same internal configuration as those in the embodiments shown in FIGS. 1 to 8, and shown in FIG. 9, but is different therefrom in the following points.

Figure 10:
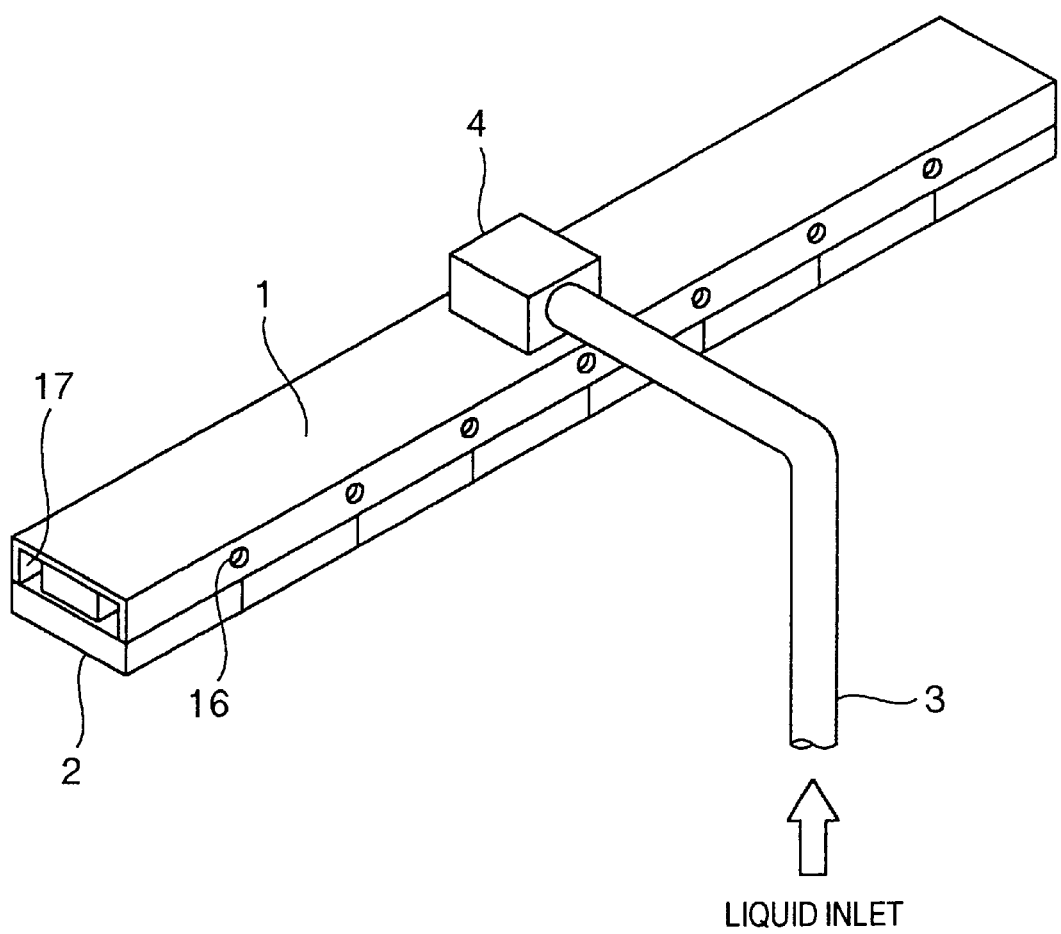
FIG. 10 is a perspective view of another embodiment of the liquid distributor according to the present invention.

More specifically, in FIG. 10, the fluid inlet for the primary distribution duct 1 and the inlet header 4 are provided on a top surface of the duct 1 to be disposed centrally along the length of the duct 1. In the embodiment, the liquid having flown into the primary distribution duct in the liquid distributor from the inlet pipe 3 through the inlet header 4 branches right and left as viewed from laterally of the liquid distributor, and then is distributed to the secondary distribution tray 2 through the liquid distribution holes as in the embodiment shown in FIG. 9.

In this manner, in the liquid distributor shown in FIG. 10, the fluid inlet to the primary distribution duct 1 and the inlet header 4 are provided on the top surface of the duct 1 to be disposed centrally along the length of the duct 1, so that the liquid having flown into the primary distribution duct branch right and left in substantially equal magnitudes of flow rate. Thus, the maximum flow rate in the primary distribution duct becomes substantially half as compared with the embodiments shown in FIG. 1 to 8. Accordingly, the primary distribution duct 1 can be decreased in cross-sectional area, and so a volume of the fluid filled therein can be reduced, thereby offering effects of making the primary distribution duct lightweight and achieving reduction in cost.

Further, in comparison with the embodiment shown in FIGS. 1 to 8, a liquid flow rate of two times as that of the above-described embodiment can be given with the primary distribution duct, of which cross section is the same as that in the above-described embodiment, and the liquid distributor, which uses such primary distribution duct. Accordingly, the configuration shown in FIG. 10 is suitable in the case where such liquid distributor is used particularly in a large-sized falling film heat exchanger having a great capacity.

Figure 2:
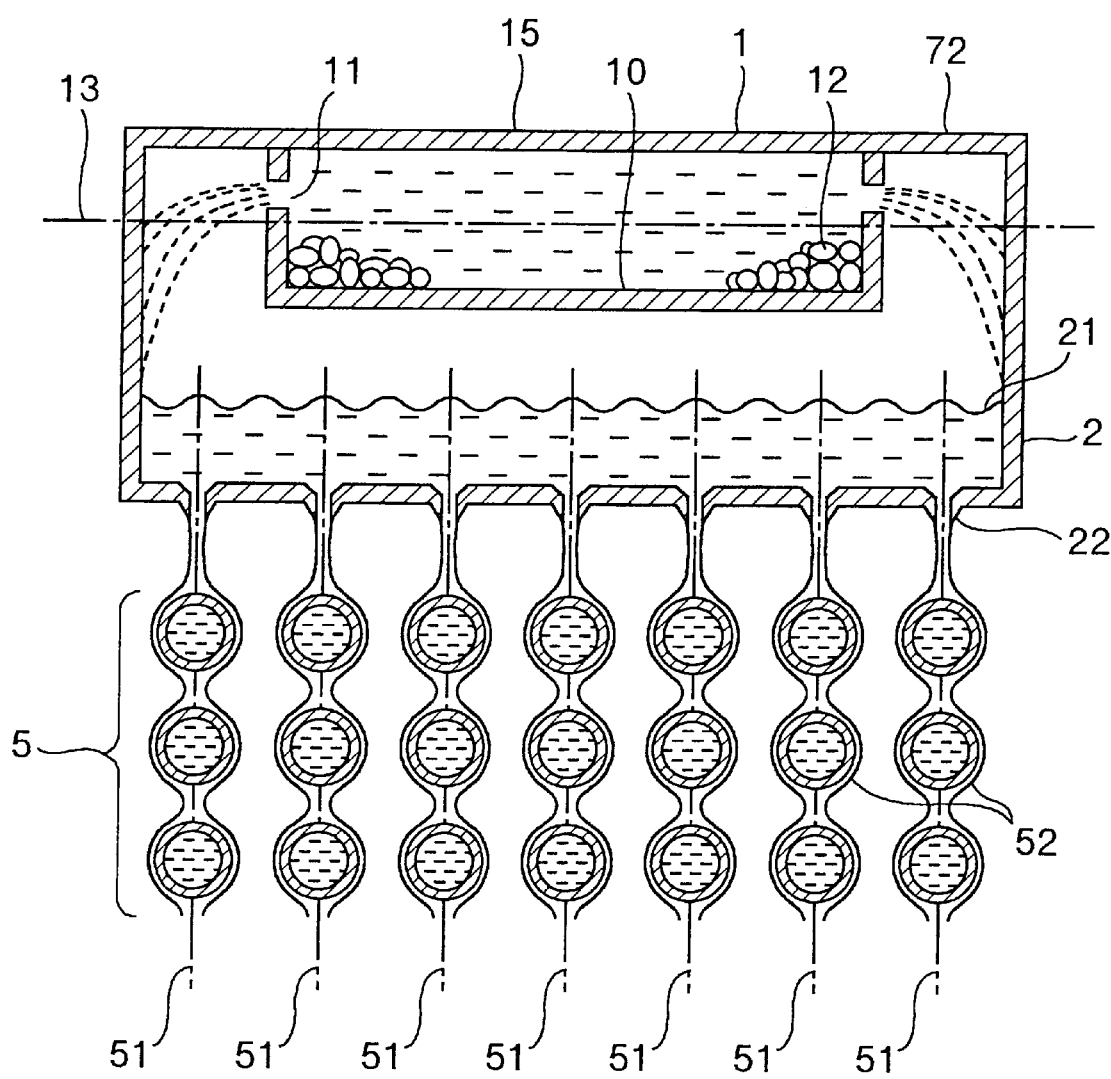
FIG. 2 is a cross sectional view showing a cross sectional construction of the liquid distributor shown FIG. 1, and showing a positional relationship between it and banks of heat exchanger tubes.
Figure 3:
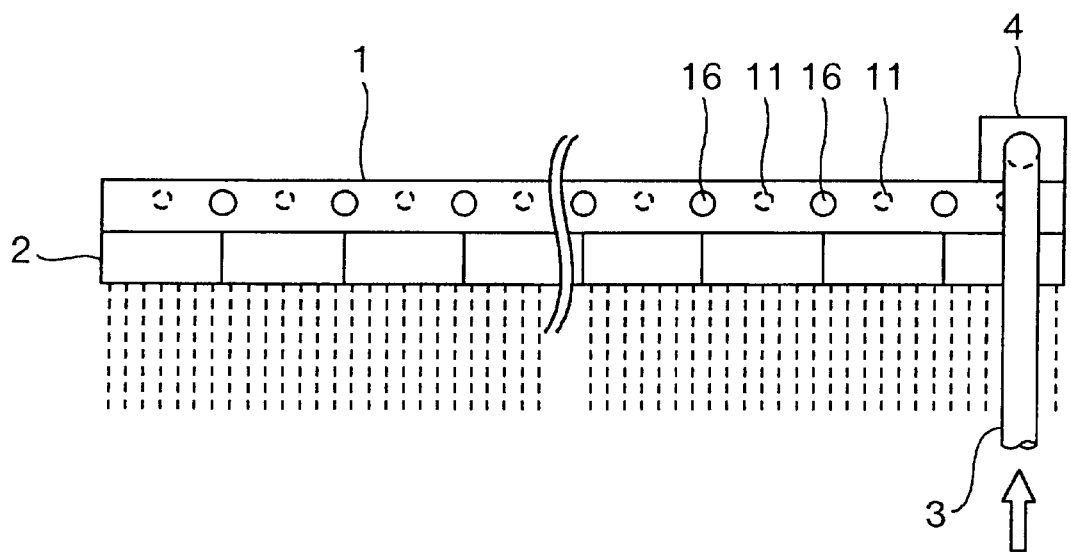
FIG. 3 is a side view showing the liquid distributor shown in FIG. 1.

An explanation will be given hereinbelow to an embodiment of a falling film heat exchanger according to the present invention with reference to FIGS. 2 and 11.

Figure 11:
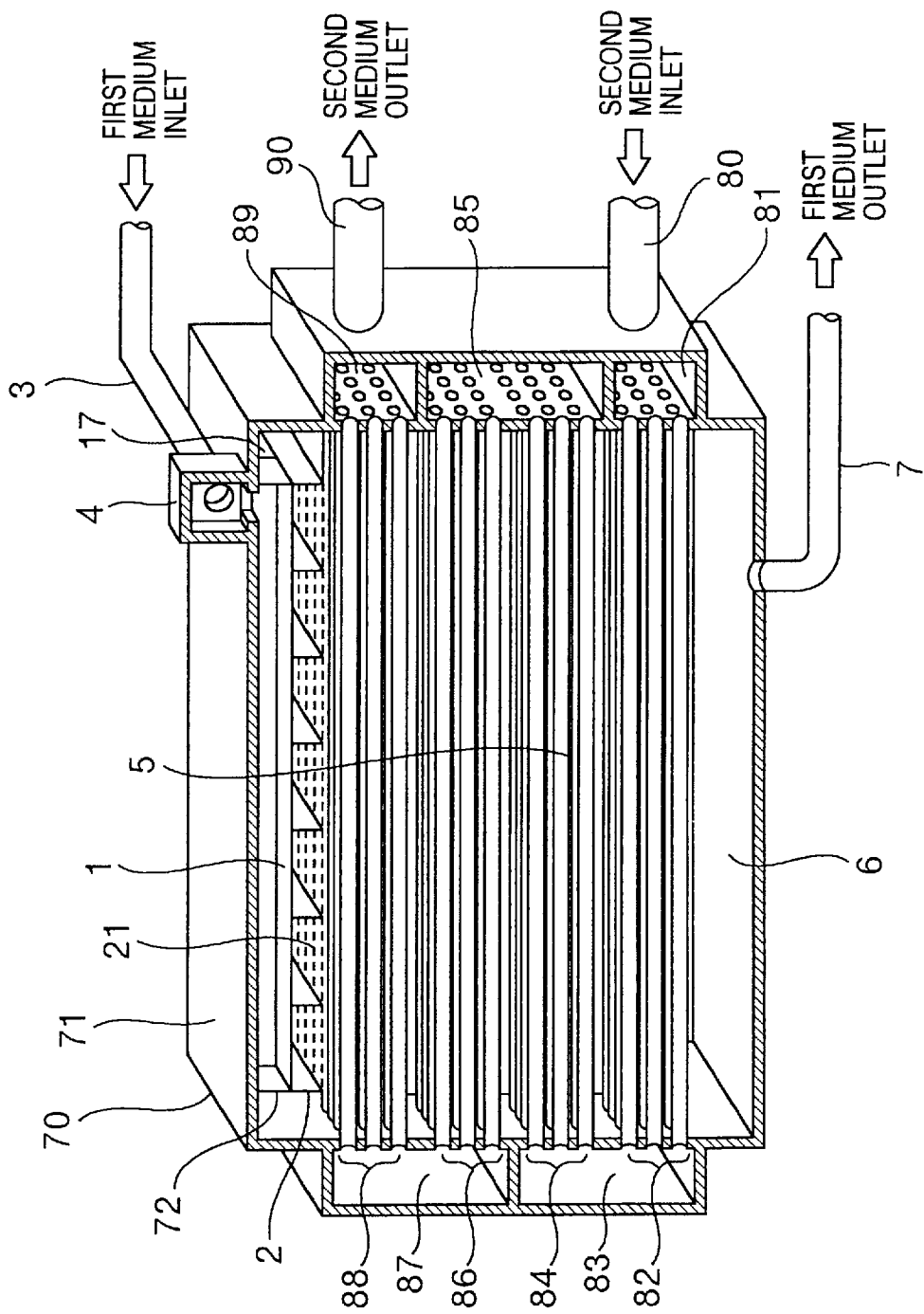
FIG. 11 is a cross sectional view showing an internal construction of an embodiment of a falling film heat exchanger according to the present invention.

FIG. 11 is a cross sectional view showing an internal construction of the falling film heat exchanger according to the present invention. As shown in the drawing, the falling film heat exchanger 70 comprises a housing or closed vessel 71, a spray device or liquid distributor 72 and banks 5 of heat exchanger tubes installed in the closed vessel, an inlet pipe 3 and an inlet header 4, through which a first heat-exchanging medium adapted to form a falling liquid film on surfaces of the banks 5 of heat exchanger tubes is conducted from the outside, a lower liquid storage section 6 for once storing the liquid dropped from the surfaces of the banks 5 of heat exchanger tubes, an outlet pipe 7, through which the liquid is conducted to outside from the liquid storage section 6, and flow passages 80 to 90 for a second heat-exchanging medium, which flows through the heat exchanger tubes. Here, the liquid distributor 72 is one which has been already explained hereinabove.

Further, the passages 80 to 90 for the second heat-exchanging medium are composed of an inlet pipe 80 provided on a lower portion of the housing 71, a first header 81, a first path 82, a second header 83, a second path 84, a third header 85, a third path 86, a fourth header 87, a fourth path 88, and a fifth header 89, and an outlet pipe 90 provided in the upper portion of the housing 71.

In addition, the first to fourth paths 82, 84, 86, 88 are flow passages defined inside small banks of tubes, which are provided by dividing the banks 5 of the heat exchanger tubes in a heightwise direction. Further, these flow passages 80 to 90 have no communication with and so completely separated from spaces, which are in the housing 71 but are outside of the heat exchanger tubes.

Here, the heat exchanger tubes constituting the banks 5 are disposed in parallel not only with one another but also with the liquid distributor 72, the liquid distributor 72 and the banks 5 of the heat exchanger tubes being installed horizontal. Further, the respective heat exchanger tubes in the banks 5 are arranged in a plurality of rows in a vertical direction, the rows being seven in number. Meanwhile, the multiplicity of liquid dripping holes 21 provided on the underside of the liquid distributor 72 are arranged in a plurality of rows in parallel with the primary distribution duct 1 over the entire liquid distributor, as shown in FIG. 11. Further, the rows of the liquid dripping holes 21 are seven in number 7, as shown in FIG. 2, to be equal to that of the heat exchanger tubes in the banks 5, that is, 100%.

Further, the positional relationship between the rows of the liquid dripping holes and the rows of the heat exchanger tubes is such that the rows of the heat exchanger tubes are disposed directly below the respective liquid dripping holes. That is, center lines 51 of the respective rows of heat exchanger tubes pass through centers of the liquid dripping hole 21 arranged thereabove.

The falling film heat exchanger 70 in the embodiment operates in the following manner.

The first medium fed outside of the heat exchanger tubes flows into the liquid distributor 72, provided in the uppermost portion of the housing 71, through the inlet header 4 from the inlet pipe 3. In the liquid distributor 72, the liquid distributing action described in connection with the embodiment of the liquid distributor causes the liquid to be sprayed onto the surfaces of the uppermost stage heat exchanger tubes of the banks 5 to form falling liquid films 52, which perform heat-exchange with the second medium in the heat exchanger tubes while flowing down the banks 5 of the heat exchanger tubes to reach the liquid section 6, and then to flow outside of the heat exchanger through the outlet pipe 7.

At this time, the second medium fed into the heat exchanger tubes flows into the first header 81 in the heat exchanger 70 from the inlet pipe 80, and is distributed into the respective heat exchanger tubes, which constitute the first path 82, to flow therethrough and simultaneously perform heat-exchange with the first medium, which flows down outside of the tubes. The second medium having passed through the first path 82 flows from the respective heat exchanger tubes into the second header 83 where it is again mixed. The thus mixed second medium is distributed into the respective heat exchanger tubes, which constitute the second path 84, in the second header 83 to perform heat-exchange with the fist medium, which flows down outside of the heat exchanger tubes. Subsequently, the liquid flows similarly through the third header 85, the third path 86, the fourth header 87, the fourth path 88 and the fifth header 89 to be discharged outside of the heat exchanger through the outlet pipe 90.

As described above, the first medium forming the falling liquid film 52 can be uniformly fed over the entire lengths of the respective heat exchanger tubes, and an effect is accordingly offered that the ratio of an area of portions covered with the falling liquid film 52 to the total area of the heat exchanger tube surfaces can be increased to enhance the performance of the heat exchanger. That is, a reduced ratio of portions, which are not covered by the falling liquid film parts and does not contribute to heat-exchange, makes it possible to provide a performance identical to that of the conventional one although a heat transfer area is smaller than that of the conventional one. Thus there is offered an effect that the heat exchanger can be made small-sized, lightweight and inexpensive.

Further, the above advantage of the liquid distributor, by which it is made possible over a long term to prevent foreign matters such as metal particles from block the liquid dripping holes, provides a falling film heat exchanger free of deterioration with the lapse of time. Further, the above advantage of the liquid distributor, by which it is made possible to favorably distribute the first medium, that is, feed the first medium onto the banks of heat exchanger tubes also in the case where the heat exchanger, equipments and systems including the heat exchanger in the liquid distributor are installed obliquely in the axial direction of the liquid distributor and of the banks 5 of heat exchanger tubes, provides a falling film heat exchanger, which is favorable in stability of performance for such oblique installation.

Further, in the embodiment, the provision of the vent holes above the second distribution trays on the liquid distributor offers an advantage that there is obtained a falling film heat exchanger of wide use, which can eliminate unstable factors such as abrupt self-evaporation and vapor absorption of the first medium to make smooth a liquid surface on the secondary distribution trays even when the first medium flows in superheated or supercooled condition relative to vapor pressure in the heat exchanger.

Further, in the embodiment described above, the respective heat exchanger tubes, which constitute the banks 5, are installed in parallel with one another, and are arranged in a plurality of rows in a vertical direction as viewed from the cross sectional plane, in which the liquid dripping holes 21 are included. The center lines of these rows, that is, straight lines 51 connecting the centers of the respective heat exchanger tubes, which constitute the rows, are aligned with the center lines of the liquid dripping holes 21 disposed above the respective heat exchanger tubes. That is, the plurality of vertical rows in the banks 5 of heat exchanger tubes are arranged so that the center lines thereof are disposed directly below either of the axial rows formed by the liquid dripping holes 21. Therefore, the first medium dripping from the liquid distributor 72 is totally and correctly fed to portions centrally, as viewed from a cross section of the uppermost heat exchanger tubes, of the uppermost heat exchanger tubes in the respective rows of the heat exchanger tubes, the rows being formed vertically in the banks of heat exchanger tubes.

Accordingly, the arrangement is effective in eliminating such factors as separation of the falling liquid film from the banks of heat exchanger tubes by virtue of the first medium being fed to end portions of the banks in a direction of cross section, and failure in formation of the falling liquid film by virtue of the first medium falling directly into the liquid storage section 6.

Further, in the embodiment, the banks 5 of the heat exchanger tubes are divided in a heightwise direction to provide the plurality of small banks of the heat exchanger tubes, in which small banks the first to fourth paths 82, 84, 86, 88 for the second medium flowing through the heat exchanger tubes are formed. With such arrangement, the second medium is made to flow successively through the lower small banks and then the upper small banks to form falling liquid films so as to have the liquid films performing heat exchange with the first medium flowing toward the lower small banks from the upper small banks. Thus, it is possible to provide a counter-flow type heat exchanger, thereby achieving enhanced performance and efficiency.

In addition, a similar effect to that described above can be obtained in the case where, instead of using straight tubes to form the banks 5 of the heat exchanger tubes and dividing the same into small banks of the heat exchanger tubes, the banks 5 of heat exchanger tubes are formed by an assembly of zigzag-shaped tubes comprising a plurality of horizontal heat transfer sections and turned sections provided between the heat transfer sections to turn 180° in a heightwise direction, and the second medium flowing in the heat exchanger tubes is made to flow upward from the lower banks of the above-described zigzag-shaped tubes.

Further, in the embodiment, a single liquid distributor can feed the first medium to all the banks of heat exchanger tubes arranged in a multiplicity of rows, so that, in the case of the rows of the heat exchanger tubes being odd, the first medium can be distributed to the banks of heat exchanger tubes without producing a surplus amount of the first medium fed. Accordingly, the falling film heat exchanger is made high in freedom upon design becomes high, and so can be made optimum as compared with those disclosed in the above-described Japanese Patent Unexamined Publication Nos. 5-172438 and 7-4782.

As described above, according to the embodiment, a falling film heat exchanger is obtained which is small-sized, lightweight, inexpensive, high in performance and efficiency, susceptible of less deterioration with the lapse of time, favorable in stability of performance for oblique installation, wide in use, and high in degree of freedom on design to afford optimization.

Figure 12:
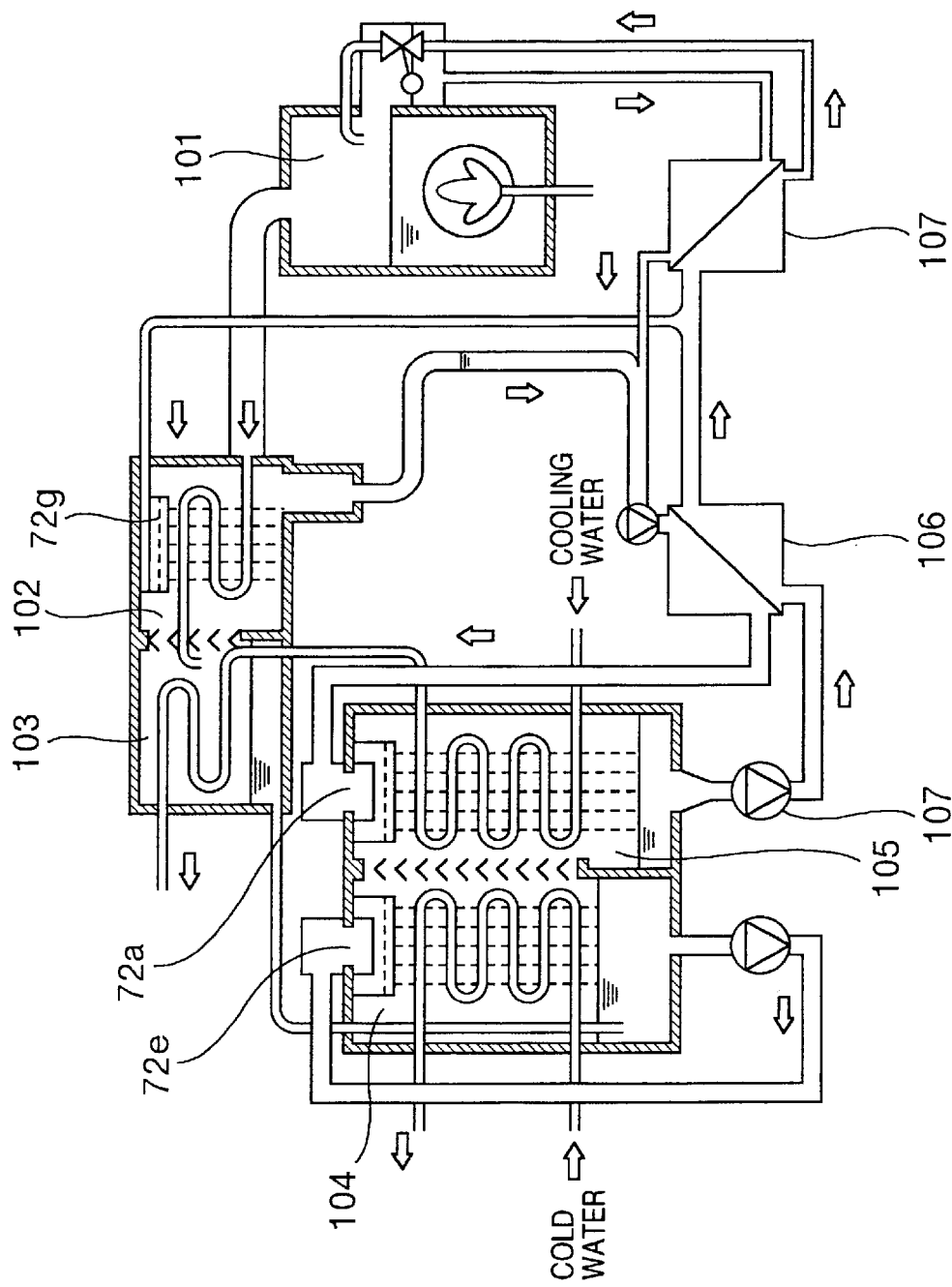
FIG. 12 is a schematic view showing an embodiment of an absorption refrigerating machine.

An absorption refrigerating machine according to an embodiment of the invention will be described hereinbelow with reference to FIGS. 12 and Table 1. In addition, the absorption refrigerating machine according to the present invention is of so-called absorption type in general, and includes an absorption refrigerating machine, an absorption cold and hot water making machine, a first class absorption heat-pump (heat amplifier), and a second class absorption heat-pump (heat transformer).

The drawing is a schematic view showing an absorption cold and hot water making machine in a form of the absorption refrigerating machine according to the present invention, and the Table indicates designations of equipments employing the liquid distributor and the falling film heat exchanger, configurations of phase change occurring outside of heat exchanger tubes, and names of working fluids in the absorption cold and hot water making machine, for the first medium adapted to form falling liquid films and the second medium flowing in heat exchanger tubes in the falling film heat exchanger.

TABLE 1

| Name of Equipment | Configuration of Phase Change outside of Heat Exchanger Tubes | First Medium outside of Heat Exchanger Tubes | Second Medium in Heat Exchanger Tubes |
|---|---|---|---|
| Evaporator | Generation (Evaporation) of Vapor from | Liquid Coolant | Cold Water |

TABLE 1-continued

| Absorber | Cooling Medium Absorption of Vapor into Absorbing Solution | Absorbing Solution (Concentrated Solution → Dilute Solution) | Cooling Water |
|---|---|---|---|
| Low Temperature Regenerator | Generation of Vapor from Absorbing Solution | Absorbing Solution (Dilute Solution → Concentrated Solution) | Coolant Vapor (condensed in Tubes) |

The absorption cold and hot water making machine comprises a high temperature regenerator 101 for heating and concentrating an absorbing solution making use of an external heat source, a low temperature regenerator 102 for forming falling liquid films outside of the heat exchanger tubes and heating and concentrating the liquid films making use of heat energy generated in the low temperature regenerator 101, a condenser 103 for condensing coolant vapor generated in the low temperature regenerator 102 and mixing the same with liquid coolant, which is generated in the high temperature regenerator 101 and condensed in the pipe in the low temperature regenerator 102, an evaporator 104 for forming falling liquid films outside of the tubes to evaporate the same to cool a cold water in the tubes, an absorber 105 for using the falling liquid films of the absorbing solution to absorb a coolant vapor generated in the evaporator 104 to keep low pressure in the vessel to promote evaporation, a low temperature heat exchanger 106 for recovering latent heat from the absorbing solution, which circulates through the high temperature regenerator 101, the low temperature regenerator 102 and the absorber 105, to achieve energy saving, a high temperature heat exchanger 107, piping and the like connecting the above components, and a pump.

In the embodiment, the liquid distributor and the falling film heat exchanger according to the present invention are applied to the low temperature regenerator 102, the evaporator 104 and the absorber 105.

Subsequently, an explanation will be given to a method of applying to the three equipments the liquid distributor and the falling film heat exchanger according to the present invention. The explanation is given assuming that the absorption cold and hot water making machine is of general dual-effect type, in which working fluids include water as the coolant and a lithium bromide water solution as the absorbing solution, and the absorption cold and hot water making machine operates in cooling mode.

A heat exchanging medium in the evaporator 104 comprises a liquid coolant flowing into the evaporator from the condenser 103, and a cold water reciprocating between a cooling load system and the absorption cold and hot water making machine. Since the liquid coolant evaporates through the gas-liquid interface, it is required to form falling liquid films. The liquid coolant is stored once in the lower portion of the evaporator 104 as the first medium for the falling film heat exchanger, and is then fed into the liquid distributor 72e by the coolant spraying pump provided in the lower portion of the evaporator.

The second medium flowing in the heat-exchanging tubes is cold water reciprocating between the cooling load system and the absorption cold and hot water making machine. The liquid coolant fed onto the banks of heat-exchanging tubes from the liquid distributor 72e forms falling liquid films to take heat from the cold water flowing in the tubes to evaporate. Such action cools the cold water in a cooling load pipe to feed the cold water into the cooling load system for cooling. Liquid coolant having not yet evaporated and flowed down in the bottom portion of the vessel is made to mix with the liquid coolant inflowing from the condenser 103 to be fed again into the liquid distributor 72e.

Subsequently, the heat exchanging medium in the absorber 105 comprises the absorbing solution having circulated thereinto from the regenerator system through the low temperature heat exchanger 106, and a cooling water for cooling the absorbing solution to maintain the absorbing capacity of the absorbing solution. Since the absorbing solution must form the falling liquid film in order to absorb the coolant vapor from the evaporator through the gas-liquid interface, it is fed into the liquid distributor 72e as a first fluid for the falling liquid film heat exchanger, and the second medium flowing in the heat exchanger tubes comprises as the cooling water. The absorbing solution having absorbed the coolant vapor and flowed down to the bottom portion of the vessel is fed to the regenerator system through the low temperature heat exchanger 106 by an absorbing solution circulating pump 107 provided in the lower portion of the absorber 105.

Subsequently, the heat exchanging medium in the low temperature regenerator 102 comprises an absorbing solution in the low temperature regenerator 102 after flowing from the absorber 105 through the low temperature heat exchanger 106 and then branching into the high temperature regenerator 101 and the low temperature regenerator 102, and a coolant vapor which is generated in the high temperature regenerator 101 and condensed in the low temperature generator 102. The absorbing solution must form a falling liquid film in order to generate a coolant vapor through the gas-liquid interface, and is fed to the liquid distributor 72g as the first medium for the falling film heat exchanger.

On the other hand, while the coolant vapor also comprises a medium adapted to undergo phase change in the low temperature regenerator, it is conducted into the condenser 103 in the case of a condensing phenomenon after it is fed as the second medium into the heat exchanger tubes to be condensed therein because the gas-liquid interface is naturally formed through condensation onto the heat transfer surfaces even if any falling liquid film is not formed. The absorbing solution having generated a coolant vapor and flowed down to the bottom of the vessel is made to again circulate into the absorber 104 together with the absorbing solution from the the high temperature regenerator 101.

As described above, in the embodiment shown in FIG. 12, the falling film heat exchangers are installed in the low temperature regenerator 102, the evaporator 104 and the absorber 105 in the absorption cold and hot water making machine. Accordingly, there is provided an absorption regenerator which is small-sized, light-weight, inexpensive, high in performance and efficiency, susceptible of less deterioration with the lapse of time, favorable in stability of performance for installation involving an oblique position, wide in use, and high in freedom of design, and which affords optimization.

Further, a circulating system for coolant and absorbing solution in the absorption refrigerating machine is provided with a circulating pump and fluid elements including a solenoid valve and a variable restrictor valve used for controlling an amount of the solution circulated, a flow regulating valve and a shut-off valve used during delivery or maintenance, and a float valve for appropriately maintaining an amount of the solution in the high temperature regenerator during operation. If foreign matters such as metal particles and fragments of copper plating peeled off is mixed in these circulation system, they are caught by the liquid distributor 72e, which constitutes a part of the circulation system for the coolant, and the liquid distributors 72a, 72g, which constitute a part of the circulation system for the absorbing solution. Thus, there is an effect, which can prevent failure in a pump, inconvenient operation of various fluid elements, and blocking-off of small flow passages, which are caused by the foreign matters, so that it is possible to provide a highly reliable absorption refrigerating machine.

As described above, the present invention provides advantages that a favorable distributing performance and formation of falling liquid films can be achieved in the liquid distributor and in the falling film heat exchanger even in the case where the heat exchanger body or the apparatus body including the heat heat exchanger is installed in oblique manner, and the liquid to be distributed is fed in supercooled or superheated condition, and that foreign matters mixed in the working fluid are favorably removed to reduce secular deterioration and the number of rows of the heat exchanger tubes can be optionally set to enhance freedom of design, thereby enabling realizing the above-described advantages at a low cost.

Further, application of the falling film heat exchanger to low temperature regenerators, evaporators, and absorbers or the like in an absorption refrigerating machines is effective in making the absorption refrigerating machine small-sized, lightweight, inexpensive, and high in reliability.

What is claimed is:

1. In a liquid distributor for distributing and sprinkling a liquid, which involves phase change in heat exchanging process, onto banks of heat exchanger tubes from above, the improvement comprising a closed primary distribution duct having an inlet and being formed with a plurality of distribution holes, which serve as liquid outlets and serve to distribute the liquid and which are aligned lengthwise of the duct, said closed primary distribution duct being closed except for said inlet and said plurality of distribution holes; and a secondary distribution tray provided below the closed primary distribution duct along the length of the duct and divided into a plurality of regions of in a longitudinal direction to correspond to the distribution holes, said respective regions being formed therein with liquid dripping holes for dripping the liquid.

2. The liquid distributor as set forth in claim 1, wherein said closed primary distribution duct comprises an upwardly opened U-shaped first member, and a downwardly opened U-shaped second member, said first member being mounted to the second member from below, and wherein the secondary distribution tray comprises an upwardly opened U-shaped member.

3. The liquid distributor as set forth in claim 2, wherein said secondary distribution tray is formed by using partitions to divide an upwardly opened U-shaped, long member into a plurality of regions.

4. The liquid distributor as set forth in claim 2, wherein said secondary tray comprises a plurality of upwardly opened U-shaped box members, which are connected to one another.

5. The liquid distributor as set forth in claim 2, wherein vent holes are formed in longitudinal side surfaces of the downwardly opened U-shaped second member of said primary distribution duct.

6. The liquid distributor as set forth in claim 5, wherein the vent holes are formed between the respective distribution holes.

7. The liquid distributor as set forth in claim 1, wherein the distribution holes have their center points which are located at higher positions than the center of the side surfaces of the upwardly opened U-shaped first member.

8. The liquid distributor as set forth in claim 1, further comprising protrusions formed around the liquid dripping holes formed in the secondary distribution tray to extend downward from the bottom surface of the tray.

9. In a falling film heat exchanger comprising banks of heat exchanger tubes for effecting heat exchange inside and outside thereof, and a liquid distributor for distributing and sprinkling a heat exchanging medium from above the heat exchanger tubes, which constitute the banks, said heat exchanging medium being adapted to flow down by gravity to form liquid films on outer wall surfaces of the heat exchanger tubes to make heat exchange with the heat exchanging medium, which flows in the tubes, the improvement wherein said liquid distributor comprises a closed primary distribution duct having an inlet and being formed with a plurality of distribution holes, which serve as liquid outlets and serve to distribute the liquid and which are aligned lengthwise of the duct, said closed primary distribution duct being closed except for said inlet and said plurality of distribution holes; and a secondary distribution tray provided below the closed primary distribution duct along the length of the duct and divided into a plurality of regions in a longitudinal direction to correspond to the distribution holes, said respective regions being formed therein with liquid dripping holes for dripping the liquid, and wherein respective heat exchanger tubes, which constitute said banks of heat exchanger tubes, are in parallel to the liquid dripping holes formed in said liquid distributor.

10. The falling film heat exchanger as set forth in claim 9, wherein the number of rows of the heat exchanger tubes, which constitute said banks of heat exchanger tubes, is set to amount to 90 to 100% of the number of rows of the liquid dripping holes.

11. The falling film heat exchanger as set forth in claim 9, wherein the banks of heat exchanger tubes are divided vertically into a plurality of subgroups of heat exchanger tubes, and the heat exchanging medium flowing in the heat exchanger tubes is made to flow subsequently from the lower one of the subgroups.

12. In a falling film heat exchanger comprising banks of heat exchanger tubes for effecting heat exchange inside and outside thereof, and a liquid distributor for distributing and sprinkling a heat exchanging medium from above the heat exchanger tubes, which constitute the banks, said heat exchanging medium being adapted to flow down by gravity to form liquid films on outer wall surfaces of the heat exchanger tubes to make heat exchange with the heat exchanging medium, which flows in the tubes, the improvement wherein said liquid distributor comprises a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, said respective regions being formed therein with liquid dripping holes for dripping the liquid, and respective heat exchanger tubes, which constitute said banks of heat exchanger tubes, are in parallel to the liquid dripping holes formed in said liquid distributor, and wherein the number of rows of the heat exchanger tubes, which constitute said banks of heat exchanger tubes, is set to amount to 90 to 100% of the number of rows of the liquid dripping holes, and the banks of heat exchanger tubes are divided vertically into a plurality of subgroups of heat exchanger tubes, and the heat exchanging medium flowing in the heat exchanger tubes is made to flow subsequently from the lower one of the subgroups.

13. In a single-effect absorption refrigerating machine including an evaporator, an absorber, a regenerator, liquid distributors, which are incorporated into the evaporator, the absorber and the regenerators to distribute and sprinkle a heat exchanging medium from above heat exchanger tubes incorporated into the regenerator to effect heat exchange inside and outside of the heat exchanger tubes, and a condenser, the improvement wherein said liquid distributor comprises a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, said respective regions being formed therein with liquid dripping holes for dripping the liquid, and wherein at least either of the evaporator, the absorber and the regenerator incorporates thereinto a falling film heat exchanger device, in which respective heat exchanger tubes, which constitute said banks of heat exchanger tubes, are in parallel to the liquid dripping holes formed in said liquid distributor.

14. A multi-effect absorption refrigerating machine including an evaporator, an absorber, a high temperature regenerator, a low temperature regenerator, liquid distributors, which are incorporated into the evaporator, the absorber and the regenerator to distribute and sprinkle a heat exchanging medium from above heat exchanger tubes incorporated into the low temperature regenerator to effect heat exchange inside and outside of the heat exchanger tubes, and a condenser, the improvement wherein said liquid distributor comprises a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, said respective regions being formed therein with liquid dripping holes for dripping the liquid, and wherein at least either of the evaporator, the absorber and the low temperature regenerator incorporates thereinto a falling film heat exchanger device, in which respective heat exchanger tubes, which constitute said banks of heat exchanger tubes, are in parallel to the liquid dripping holes formed in said liquid distributor.

15. A multi-effect absorption refrigerating machine including an evaporator, an absorber, a high temperature regenerator, a low temperature regenerator, liquid distributors, which are incorporated into the evaporator, the absorber and the regenerator to distribute and sprinkle a heat exchanging medium from above heat exchanger tubes incorporated into the low temperature regenerator to effect heat exchange inside and outside of the heat exchanger tubes, and a condenser, the improvement wherein said liquid distributor comprises a primary distribution duct formed with a plurality of distribution holes, which serve as liquid outlets and serve to distribute the liquid and which are aligned lengthwise of the duct; and a secondary distribution tray provided below the primary distribution duct along the length of the duct and divided into a plurality of regions in a longitudinal direction to correspond to the distribution holes, said respective regions being formed therein with liquid dripping holes for dripping the liquid, and respective heat exchanger tubes, which constitute said banks of heat exchanger tubes, are in parallel to the liquid dripping holes formed in said liquid distributor, and wherein the number of rows of the heat exchanger tubes, which constitute said banks of heat exchanger tubes, is set to amount to 90 to 100% of the number of rows of the liquid dripping holes, and at least either of the evaporator, the absorber and the low temperature regenerator incorporates thereinto a falling film heat exchanger device, in which the banks of heat exchanger tubes are divided vertically into a plurality of subgroups of heat exchanger tubes, and in which the heat exchanging medium flowing in the heat exchanger tubes is made to flow subsequently from the lower one of the subgroups.

* * * * *